Patented June 11, 1935

2,004,297

UNITED STATES PATENT OFFICE 2,004,297

RESIN AND COATING OR PLASTIC COMPOSITION CONTAINING THE SAME

George W. Seymour and Blanche B. White, Cumberland, Md., assignors to Celanese Corporation of America, a corporation of Delaware No Drawing. Application April 26, 1932, Serial No. 607,661

9 Claims. (Cl. 260—8)

This invention relates to the preparation of a synthetic resin from the acetic acid ester of glycerol and a resin acid, and also to coating or plastic compositions containing such resin.

An object of our invention is to prepare a synthetic resin of low acidity and therefore suitable for use in films, lacquers or other coating compositions or plastics.

A further object of our invention is to provide a suitable resin for lacquers or plastic compositions, which may or may not contain derivatives of cellulose, which resin is compatible with the other constituents of the lacquers and which produces clear solutions which upon drying form films that are adherent, tough and hard.

The preparation of a lacquer containing derivatives of cellulose as the main constituent of the lacquer base, which lacquer is to be applied to a hard, smooth surface presents many difficulties. This is due primarily to the fact that films from lacquers containing these cellulose derivatives as the sole constituent of the lacquer base do not adhere to smooth surfaces. Therefore it is necessary to incorporate natural gums or resins in the lacquer containing these cellulose esters in order to impart the necessary adhesive qualities to the film produced from it.

While ester gum, which is the glycerol ester of rosin or glycerol triabietate, is compatible with cellulose nitrate, and is therefore widely used in cellulose nitrate lacquers, it is not compatible with cellulose acetate or cellulose propionate or other organic derivatives of cellulose; with the result that films produced from lacquers containing the organic derivative of cellulose and ester gum are dull and opaque. Moreover, such ester gum has a relatively high acidity and for this reason, its use is often objectionable.

We have found that synthetic resins produced by the reaction of an acetic acid ester of a polyhydric alcohol with a resin acid in the absence or presence of a suitable catalyst have a very low acid value or number and are compatible with cellulose nitrate, cellulose propionate or other derivatives of cellulose, and that when added to lacquers containing cellulose propionate or cellulose nitrate they form clear solutions that upon drying produce clear, hard and tough and firmly adherent films, which have other desirable properties because of the low acid number of the resin.

In accordance with our invention, we prepare special synthetic resins that are mixed polyhydric alcohol esters of acetic acid and resin acids, and which may be formed by the reaction of the partial acetic acid ester of a polyhydric alcohol with a resin acid. These synthetic resins are then used for making a lacquer or plastic composition which may or may not contain one or more derivatives of cellulose and a volatile solvent. The lacquer or coating composition may contain also one or more natural or semi-synthetic resins or gums, one or more plasticizers or softening agents, medium and/or high boiling point solvents and preferably, but not necessarily, some pigments and/or dyes.

Solutions thus formed may be employed as a lacquer or composition for metal, glass or other surfaces and may be used for making photographic or other films. Artificial yarns may be formed by extruding the solution containing the derivative of cellulose and the special resin through the orifices of a spinneret, either into a heated evaporative atmosphere as in dry spinning, or into a precipitating bath as in wet spinning. The solution may also be employed as an adhesive, and is particularly useful in this connection for making shatterless glass by causing celluloid sheets to adhere to surfaces of sheets of glass between which they are placed.

The plastic composition containing derivatives of cellulose and the special resin may be worked into sheets which may also be used for laminated glass, and also may be worked into blocks or articles in any known manner.

Molding compositions may be made by intimately mixing the derivative of cellulose with the special resin with or without plasticizer, and these compositions may be molded under heat and pressure to form any articles of desired shape.

The derivative of cellulose that may be used for making the solutions for coating or plastic compositions comprises any suitable derivative, such as cellulose nitrate or organic derivatives of cellulose. Examples of organic derivatives of cellulose are organic esters of cellulose such as cellulose acetate, cellulose propionate, cellulose formate and cellulose butyrate or cellulose ethers such as ethyl cellulose, methyl cellulose and benzyl cellulose.

The low boiling point solvent that may be employed may be one or a mixture of two or more of the following: acetone, ethylene formal, alcohol, benzene or ethylene dichloride. Examples of medium and/or high boiling point solvents are ethyl acetate, ethyl lactate, formal glycerol, tetrachlorethane, benzyl alcohol or diacetone alcohol. Of course it is understood that the choice of the solvents depends on the solubility characteristics of the particular derivative of cellulose employed. Examples of suitable plasticizers are diphenylol propane, triacetin, dibutyl tartrate, diethyl phthalate, dimethyl phthalate, toluene sulfonamid, mono-methyl xylene sulfonamid. If desired, fire retardants may be added, particularly the very effective bromine derivatives of organic compounds, such as brominated tricresyl phosphate. The pigments or dyes that may be used may be those ordinarily employed in the paint or lacquer industry.

Of the natural gums or resins that may be added, the following may be mentioned: manila, acaroides, pontianak, kauri, dammar, and shellac. If desired, synthetic resins, other than the special mixed acetic and resin acid of glycerol resin may be employed in conjunction therewith, and examples of these are the fusible and soluble phenol-formaldehyde or diphenylol propane-formaldehyde resins preferably prepared in the presence of acid catalysts.

The resin made and employed in this invention is a mixed acetic acid and a resin acid, such as abietic acid, ester of a polyhydric alcohol, such as glycerol, glycol, diethylene glycol, or propylene glycol. These resins may be conveniently formed by the reaction of the partial acetic acid esters of these polyhydric alcohols with the resin acid. Thus, monacetin,

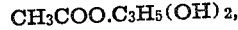

which is the monoacetic acid ester of glycerol, or diacetin,

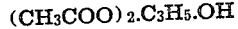

which is the di-acetic acid ester of glycerol, may be reacted with abietic acid, rosin, or other resin acid to form the resin. Examples of other partial acetic acid esters of the polyhydric alcohols that may be employed for making the resin are glycol monoacetate and propylene glycol monoacetate.

As an example of modes of preparing the resin, the following is given. One molecular proportion of abietic acid, $C_{20}H_{30}O_2$ is heated with 1.2 molecular proportions of either monoacetin or diacetin in the presence of aluminum in amount equal to 2% of the weight of the abietic acid employed. The temperature of reaction is 271° C. and the heating is continued with stirring for 3 hours. Resins having an acid number of 5 to 8 are formed in this manner, which resins have the desirable properties above described. The resin formed from the diacetin has better compatibility with organic derivatives of cellulose than do the resins formed from the monacetin.

It is to be understood that the foregoing detailed description is given merely by way of illustration, and that many variations may be made therein, without departing from the spirit of our invention.

Having described our invention, what we claim and desire to secure by Letters Patent is:

1. Method of preparing a synthetic resin comprising reacting a partial acetic acid ester of a polyhydric alcohol with a resin acid.

2. Method of preparing a synthetic resin comprising reacting a partial acetic acid ester of a polyhydric alcohol with abietic acid.

3. Method of preparing a synthetic resin comprising reacting a partial acetic acid ester of glycerol with abietic acid.

4. Method of preparing a synthetic resin comprising reacting diacetin with a substance selected from the group consisting of abietic acid and rosin.

5. Method of preparing a synthetic resin comprising reacting monoacetin with a substance selected from the group consisting of abietic acid and rosin.

6. A synthetic resin which is the mixed acetic acid and resin acid ester of a polyhydric alcohol produced by the process of claim 1.

7. A synthetic resin which is a mixed acetic acid and abietic acid ester of glycerol produced by the process of claim 3.

8. A synthetic resin which is an abietic acid ester of diacetin produced by reacting diacetin with abietic acid.

9. A synthetic resin which is an abietic acid ester of monacetin produced by reacting monacetin with abietic acid.

GEORGE W. SEYMOUR.
BLANCHE B. WHITE.